(12) United States Patent
Asanuma et al.

(10) Patent No.: US 9,376,988 B2
(45) Date of Patent: Jun. 28, 2016

(54) EXHAUST GAS RECIRCULATION VALVE

(71) Applicants: AISAN KOGYO KABUSHIKI KAISHA, Obu-shi, Aichi (JP); TOYOTA JIDOSHA KABUSHIKI KAISHA, Toyota-shi, Aichi (JP)

(72) Inventors: Hiroshi Asanuma, Chita (JP); Yoshimasa Ito, Mie-gun (JP); Kazumasa Nakashima, Nagoya (JP); Takashige Inagaki, Obu (JP); Tomoyuki Noguchi, Nisshin (JP); Takashi Tomita, Toyota (JP); Junji Torishima, Toyota (JP); Taro Furukubo, Nagoya (JP)

(73) Assignees: AISAN KOGYO KABUSHIKI KAISHA, Obu (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 14/094,357

(22) Filed: Dec. 2, 2013

(65) Prior Publication Data
US 2014/0158098 A1 Jun. 12, 2014

(30) Foreign Application Priority Data
Dec. 7, 2012 (JP) ................................. 2012-267852

(51) Int. Cl.
*F02M 25/07* (2006.01)

(52) U.S. Cl.
CPC ............ *F02M 25/0714* (2013.01); *Y02T 10/121* (2013.01)

(58) Field of Classification Search
CPC .......... F02M 25/0773; F02M 25/0772; F02M 25/079; F02M 25/0724; F02M 25/0749; F02M 25/0771; F01L 3/08; F01L 3/22; F02D 9/1045; F16K 1/38; F16K 1/44
USPC ............... 123/568.11, 568.12, 568.18, 188.1, 123/188.5, 188.8, 188.17
See application file for complete search history.

(56) References Cited

U.S. PATENT DOCUMENTS 5,129,623 A * 7/1992 Lockwood ............ F02M 26/58
123/568.26
5,685,519 A * 11/1997 Bircann ............... F16K 31/0655
251/129.15

(Continued)

FOREIGN PATENT DOCUMENTS

| JP | U-61-31593 | 2/1986 |
| JP | Y2-61-31593 | 9/1986 |

(Continued)

*Primary Examiner* — Lindsay Low
*Assistant Examiner* — Long T Tran
(74) *Attorney, Agent, or Firm* — Oliff PLC (57) ABSTRACT

In an EGR valve, a valve element is moved with respect to a valve seat to adjust a passage section width of a measuring section, thereby regulating an EGR gas flow rate in a passage. The valve seat includes a valve hole, a first end face facing to a downstream side of the passage and a second end face facing to an upstream side of the passage. The inner circumferential surface of the valve hole has a concave curved shape with an inner diameter gradually increasing toward the second end face. The valve element is placed inside the valve hole to be movable in between a fully closed position and a fully open position. While the valve element is placed in the fully open position, passage section widths of parts of the measuring section in an EGR gas flow direction are approximate to each other.

6 Claims, 11 Drawing Sheets

(56) References Cited

U.S. PATENT DOCUMENTS

| | | | |
|---|---|---|---|
| 5,875,779 A * | 3/1999 | Fuhrman | A47C 15/008 128/845 |
| 6,062,535 A | 5/2000 | Ruth et al. | |
| 6,168,134 B1 * | 1/2001 | Ruth | F16K 1/54 123/568.27 |
| 7,143,993 B2 * | 12/2006 | Everingham | F16K 31/047 123/568.24 |
| 2004/0007221 A1 * | 1/2004 | McConnell | F02M 26/48 123/568.21 |
| 2005/0092308 A1 * | 5/2005 | Tsokonas | F02M 26/48 123/568.23 |
| 2006/0032485 A1 * | 2/2006 | Wilson | F02M 26/74 123/568.11 |
| 2007/0194260 A1 * | 8/2007 | Seiyama | F01L 3/08 251/129.15 |
| 2010/0270486 A1 * | 10/2010 | Kato | H02K 7/06 251/129.12 |

FOREIGN PATENT DOCUMENTS

| | | |
|---|---|---|
| JP | A-5-321770 | 12/1993 |
| JP | H05-340313 A | 12/1993 |
| JP | A-9-42072 | 2/1997 |
| JP | H10-227259 A | 8/1998 |
| JP | A-2008-202516 | 9/2008 |
| JP | 2012-197719 A | 10/2012 |
| JP | 2012-219903 A | 11/2012 |

* cited by examiner

EXHAUST GAS RECIRCULATION VALVE

CROSS-REFERENCE TO RELATED APPLICATIONS

This application is based upon and claims the benefit of priority from each of the prior Japanese Patent Application No. 2012-267852 filed on Dec. 7, 2012, the entire contents of which are incorporated herein by reference.

BACKGROUND OF THE INVENTION

1. Field of the Invention

The present invention relates to an exhaust gas recirculation (EGR) valve provided in an EGR passage of an EGR apparatus and to be driven by an actuator.

2. Related Art

Figure 7:
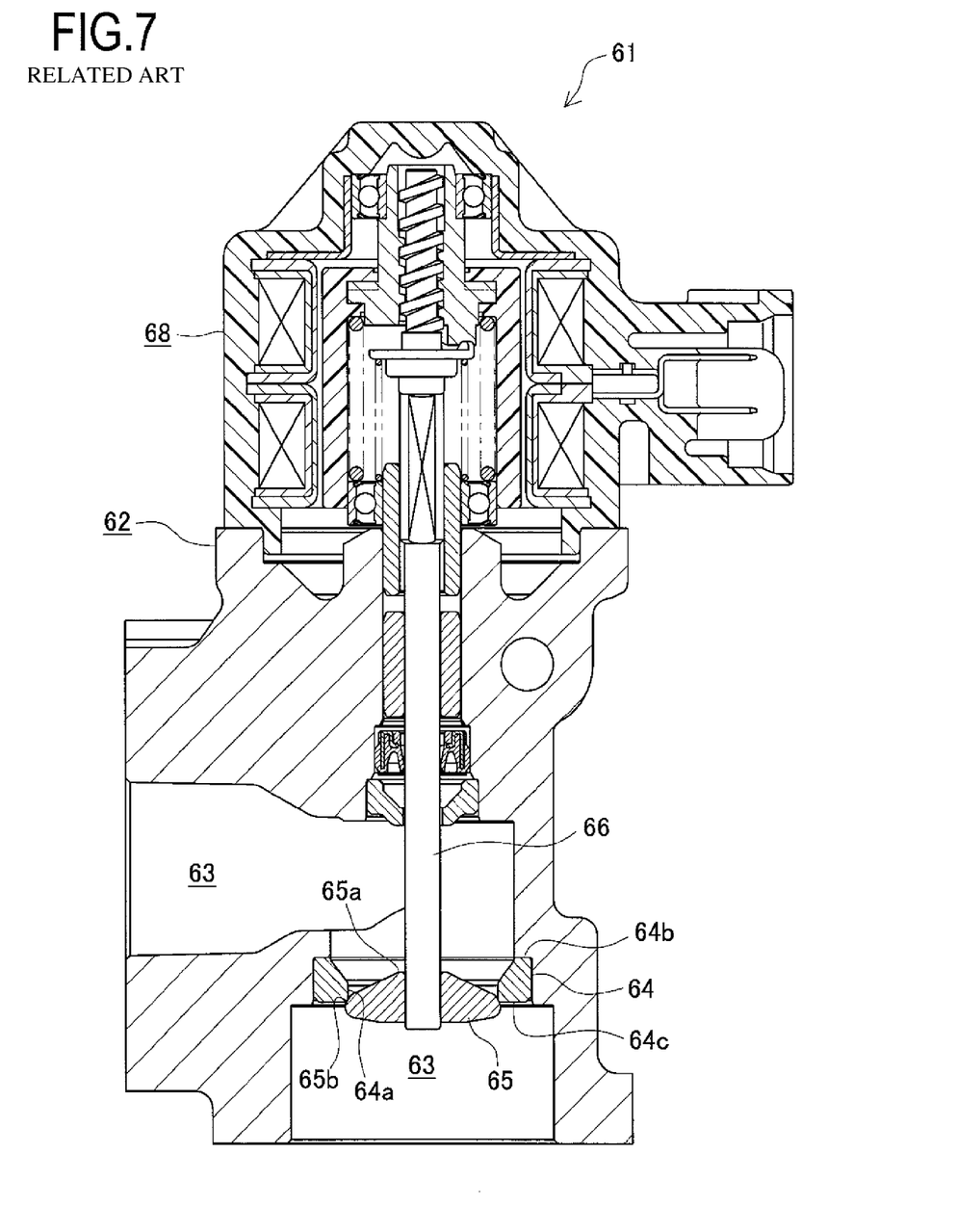
FIG. 7 is a cross sectional view showing a conventional EGR valve in a fully closed state in a conventional example.
Figure 8:
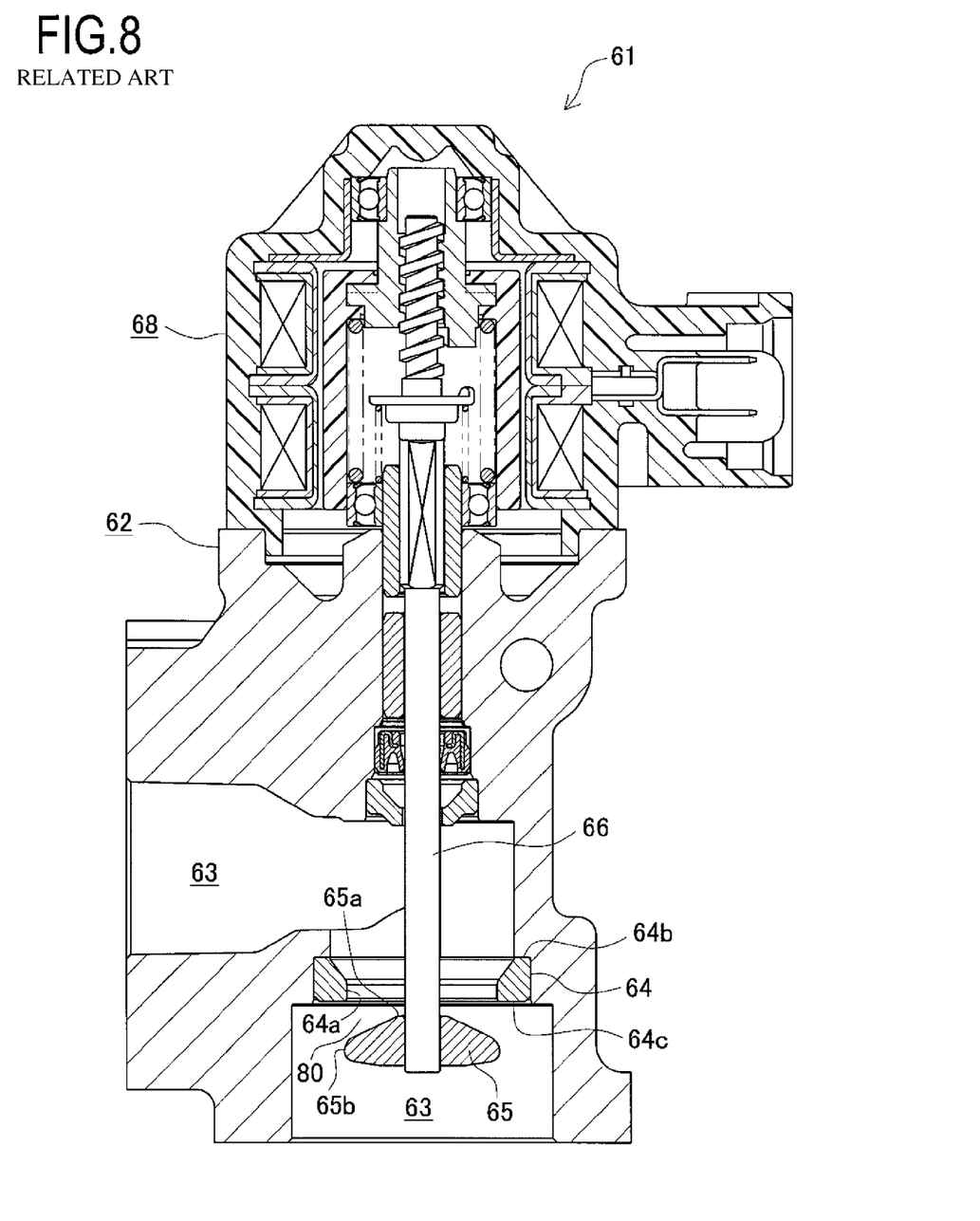
FIG. 8 is a cross sectional view showing the conventional EGR valve in a fully open state in the conventional example.

As the above type of technique, there is conventionally known an exhaust gas recirculation (EGR) valve 61 of a poppet valve structure as shown in FIGS. 7 and 8, for example. This conventional EGR valve 61 is provided with a housing 62 including a passage 63 for EGR gas, a valve seat 64 provided at some place in the passage 63, a valve element 65 provided to be seatable on the valve seat 64 and to form a measuring section 80 for EGR gas between the valve element 65 and the valve seat 64, a valve stem 66 provided, at its one end, with the valve element 65 to move the valve element 65 with respect to the valve seat 64, and an actuator 68 to make stroke movement of the valve stem 66 together with the valve element 65 in an axial direction. The valve stem 66 is stroke-moved by the actuator 68 to adjust an opening degree of the measuring section 80 and regulate a flow rate of EGR gas allowed to flow through the passage 63. Accordingly, gas flow rate characteristics of the conventional EGR valve 61 is defined by the shapes of the valve element 65 and the valve seat 64. JP-A-2008-202516 discloses one example of this type of EGR valve. FIG. 7 is a cross sectional view showing a fully closed state of the conventional EGR valve 61. FIG. 8 is a cross sectional view showing a fully open state of the conventional EGR valve 61.

Meanwhile, the present applicant analyzed a flow of EGR gas in the conventional EGR valve 61 and found that a flow of EGR gas is blocked or disturbed due to the shape of the measuring section 80 defined by the valve seat 64 and the valve element 65. Specifically, in the conventional EGR valve 61, the valve seat 64 is annular and has a valve hole 64a at the center thereof. The valve element 65 has a nearly flattened conical shape. In FIGS. 7 and 8, the valve seat 64 includes a first end face 64b and a second end face 64c arranged in an axial direction. The inner peripheral surface of the valve hole 64a is tapered so that a half of the valve hole 64a in the axial direction has an inner diameter increasing toward a downstream side of EGR gas, that is, toward the first end face 64b. The valve element 65 is configured such that, in a fully closed state as shown in FIG. 7, a minimum outer-diameter portion 65a of the valve element 65 is placed inside the valve hole 64a and a portion around a maximum outer-diameter portion 65b of the valve element 65 is in contact with an inner peripheral edge of the second end face 64c of the valve seat 64 to close the valve hole 64a.

Figure 9:
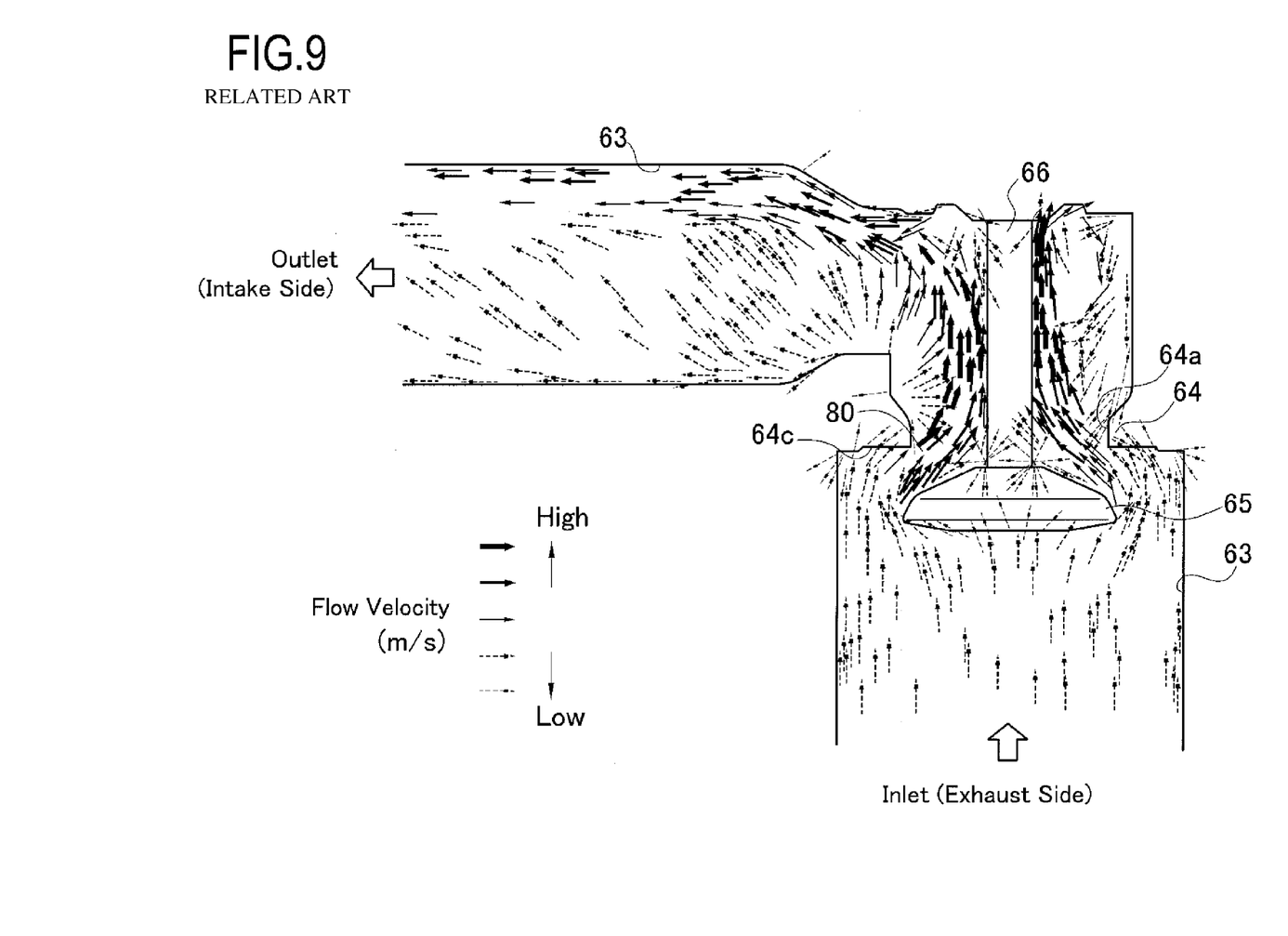
FIG. 9 is an explanatory view showing CAE analysis result of EGR gas flow (EGR gas flow direction and EGR gas flow velocity distribution) in a passage in the fully open state of the conventional EGR valve in the conventional example.
Figure 10:
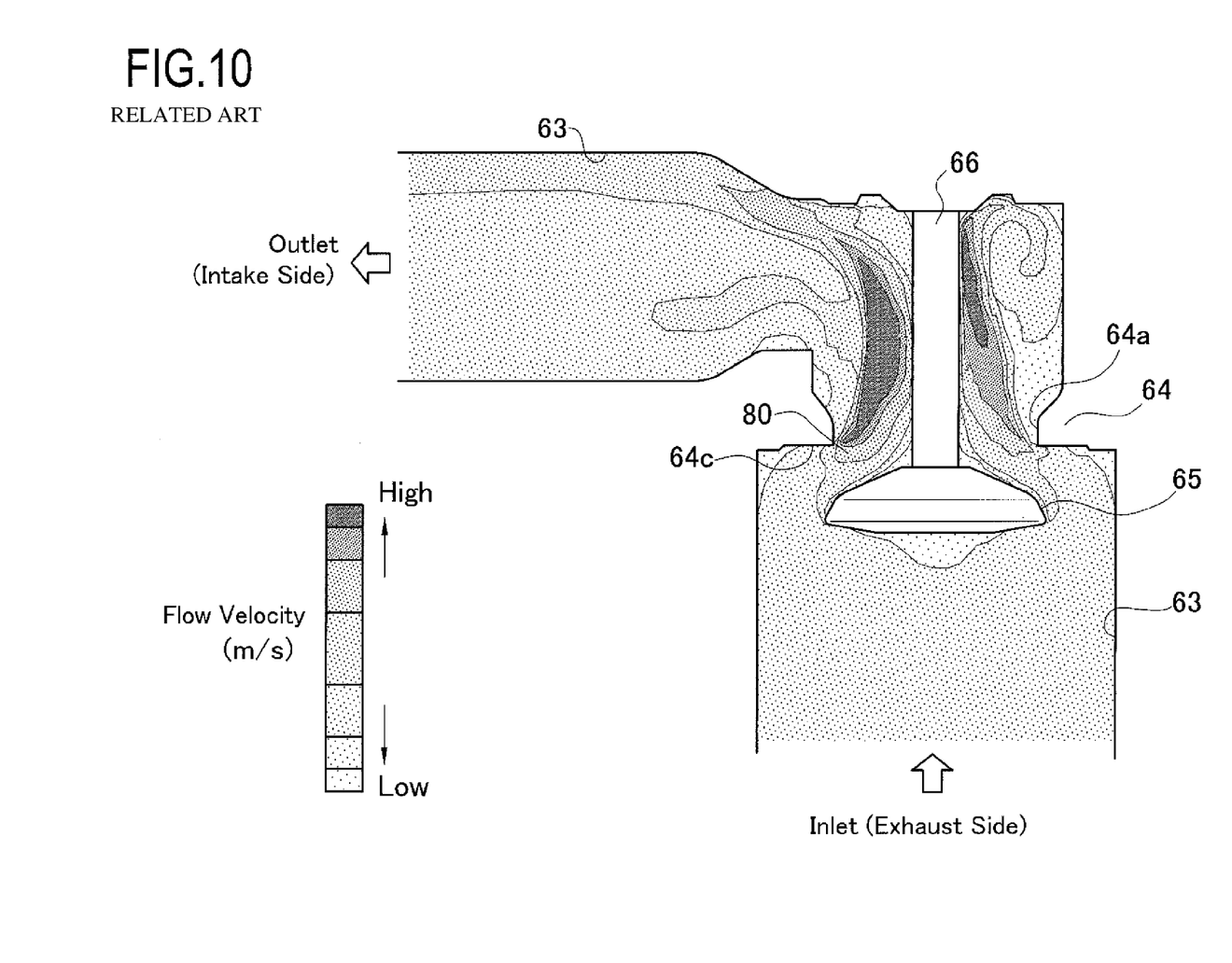
FIG. 10 is an explanatory view showing CAE analysis result of EGR gas flow (EGR gas flow velocity distribution) in the passage in the fully open state of the conventional EGR valve in the conventional example.

FIG. 9 is an explanatory diagram showing CAE analysis result of an EGR gas flow (EGR gas flow direction and EGR gas flow velocity distribution) in the passage 63 in the fully open state. FIG. 10 is an explanatory diagram similarly showing CAE analysis result of the EGR gas flow (EGR gas flow velocity distribution) in the passage 63 in the fully open state in the conventional EGR valve 61. In FIGS. 9 and 10, the EGR gas flow along the inner peripheral surface of the passage 63 impinges on the second end face 64c of the valve seat 64 and changes the orientation by 90° toward the valve hole 64a. Thereafter, the EGR gas flow passes through the measuring section 80 defined between the valve seat 64 and the valve element 65 and goes toward the downstream side of the passage 63 while spreading along the tapered shape of the valve hole 64a. As shown in FIGS. 8 and 9, in the conventional EGR valve 61, at the second end face 64c of the valve seat 64, the opening area of the measuring section 80 is minimum. Accordingly, the EGR gas flow from upstream of the measuring section 80 is constricted by the measuring section 80, and the flow toward downstream of the measuring section 80 spreads from the measuring section 80, resulting in large pressure loss. Thus, before and behind the measuring section 80, stagnation and peel-off (eddy) of the EGR gas flow are caused, leading to blockage or disturbance of the EGR gas flow. As shown in FIGS. 9 and 10, the EGR gas flow spreads when passing through the valve seat 64, so that the flow velocity is relatively increased in a position close to the center (valve stem 66) of the passage 63, but the flow velocity is decreased under the influence of eddy flow and others in a position close to the outer circumferential side in the passage 63. The flow velocity of EGR gas is relatively increased only in an area near the valve stem 66 and the flow velocity is not so increased in other areas.

Figure 11:
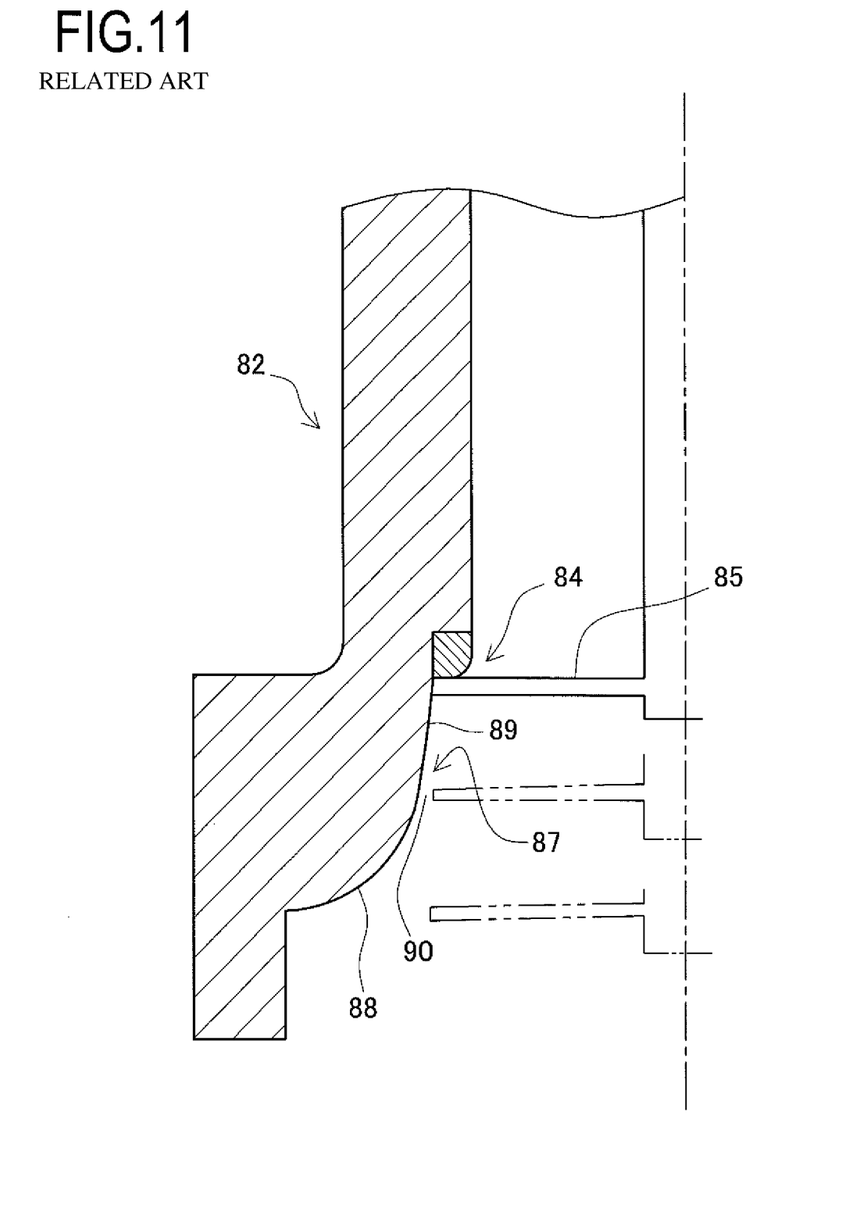
FIG. 11 is an enlarged cross sectional view showing part of a valve hole of an EGR valve in another conventional example.

Herein, for example, JP-A-9(1997)-42072 discloses an EGR valve configured such that the shape of a valve seat is designed to accurately control an EGR gas flow rate in a low opening region and ensure a maximum flow rate of EGR gas in a high opening region. As shown in FIG. 11, a housing 82 of this EGR valve is provided, in a portion corresponding to a valve seat, with a diameter increasing portion 87 that gradually widens a gas passage from a seating portion 84 on which a plate-like valve element 85 is seatable, toward a valve opening side. This diameter increasing portion 87 has a convex-curved shape having an inner diameter gradually increasing toward an upstream side. The diameter increasing rate of a zone 88 of the diameter increasing portion 87 on the valve opening side is set to be larger than the diameter increasing rate of a zone 89 on the side close to the valve seating portion 84. FIG. 11 is an enlarged cross sectional view showing part of the housing of the EGR valve.

SUMMARY OF INVENTION

Problem to be Solved by the Invention

However, even in the EGR valve disclosed in JP-A-9 (1997)-42072, it is found from FIG. 11 that an opening area of the measuring section 90 defined between the diameter increasing portion 87 and the valve element 85 is smaller than other portions in a fully open state. Accordingly, the EGR gas flow from upstream of the measuring section 90 is sharply constricted in the measuring section 90 and the EGR gas flow toward downstream of the measuring section 90 is abruptly increased from the measuring section 90, resulting in large pressure loss. Therefore, before and behind the measuring section 90, stagnation and peel-off (eddy) of the EGR gas flow are caused, leading to blockage or disturbance to the EGR gas flow. Herein, in the EGR valve, it is necessary to increase the inner diameter of the seating portion 84 on which the valve element 85 is seatable, in order to increase a maximum flow rate of EGR gas. As a result, the EGR gas flow rate could not be accurately controlled in a low opening region.

The present invention has been made in view of the above circumstances and has a purpose to provide an exhaust gas recirculation valve capable of increasing a maximum flow rate of EGR gas without particularly increasing an opening area of a measuring section between a valve seat and a valve element.

Means of Solving the Problem

To achieve the above purpose, one aspect of the invention provides an exhaust gas recirculation valve including: a housing including a passage for exhaust recirculation gas; a valve seat provided in the passage; a valve element provided to be seatable on the valve seat and arranged to form a measuring section of the exhaust recirculation gas between the valve seat and the valve element; and a valve stem provided with the valve element at one end, the exhaust gas recirculation valve being configured to move the valve element together with the valve stem with respect to the valve seat to adjust an opening area of the measuring section and regulate a flow rate of the exhaust recirculation gas, wherein the valve seat includes a valve hole at a center thereof and includes a first end face and a second end face in an axial direction, the first end face is placed to face to a downstream side of the passage and the second end face is placed to face to an upstream side of the passage, and the valve hole includes an inner peripheral surface having a concave curved shape so that an inner diameter of the valve hole gradually increases toward the second end face, the valve element is placed inside the valve hole and provided to be movable together with the valve stem in the axial direction of the valve seat between a fully closed position in which the valve element contacts with the inner peripheral surface of the valve hole and a fully open position in which the valve element is separated at a maximum from the inner peripheral surface of the valve hole, and while the valve element is placed in the fully open position, parts of the measuring section in a flow direction of the exhaust recirculation gas have passage widths in cross section approximate to each other.

Effects of the Invention

According to the present invention, it is possible to increase a maximum flow rate of exhaust recirculation gas without particularly increasing an opening area of a measuring section defined between a valve seat and a valve element.

DESCRIPTION OF EMBODIMENTS

A detailed description of an embodiment of an exhaust gas recirculation (EGR valve) embodying the present invention will now be given referring to the accompanying drawings.

Figure 1:
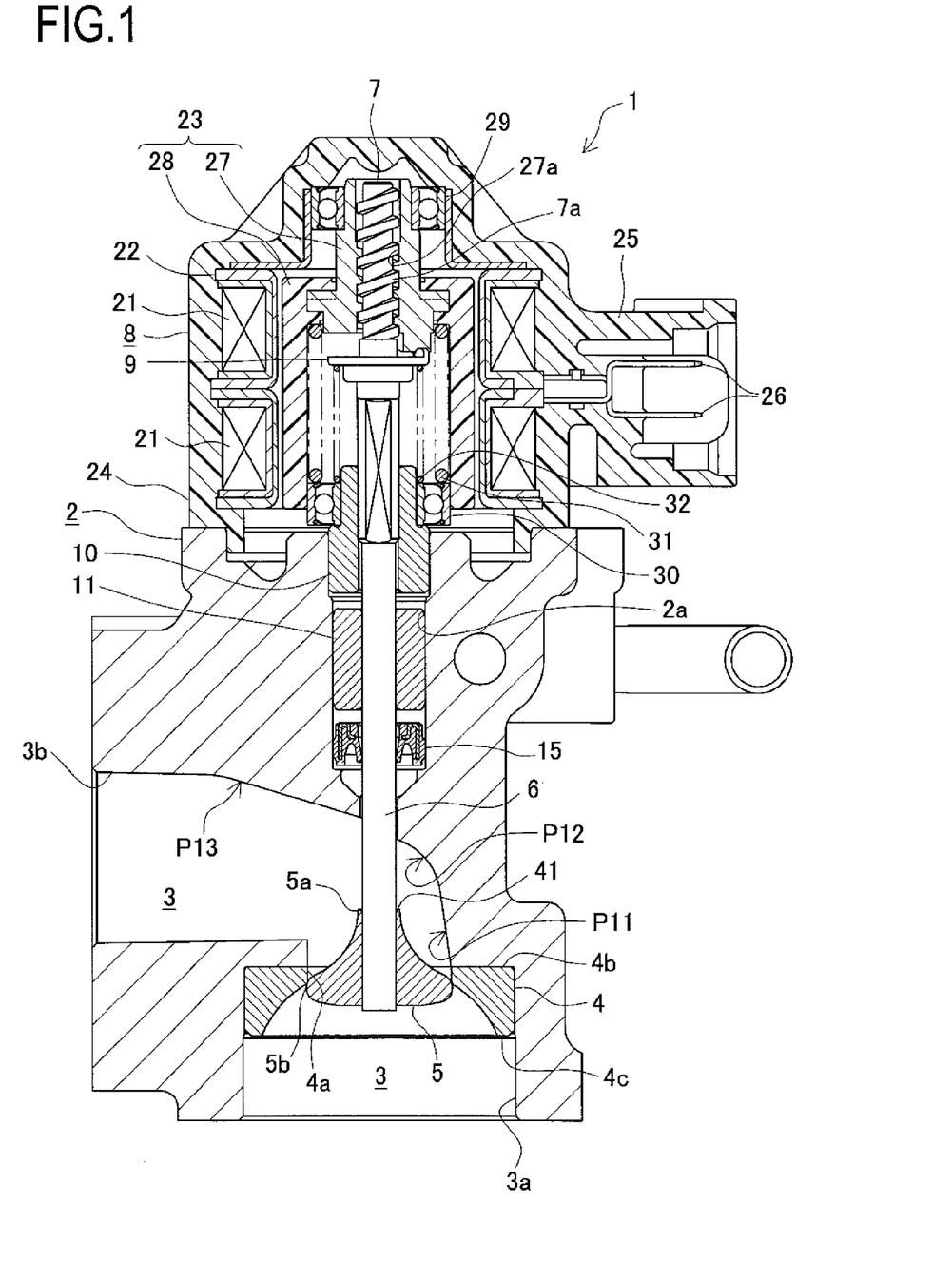
FIG. 1 is a front cross sectional view showing an EGR valve in a fully closed state in one embodiment.
Figure 2:
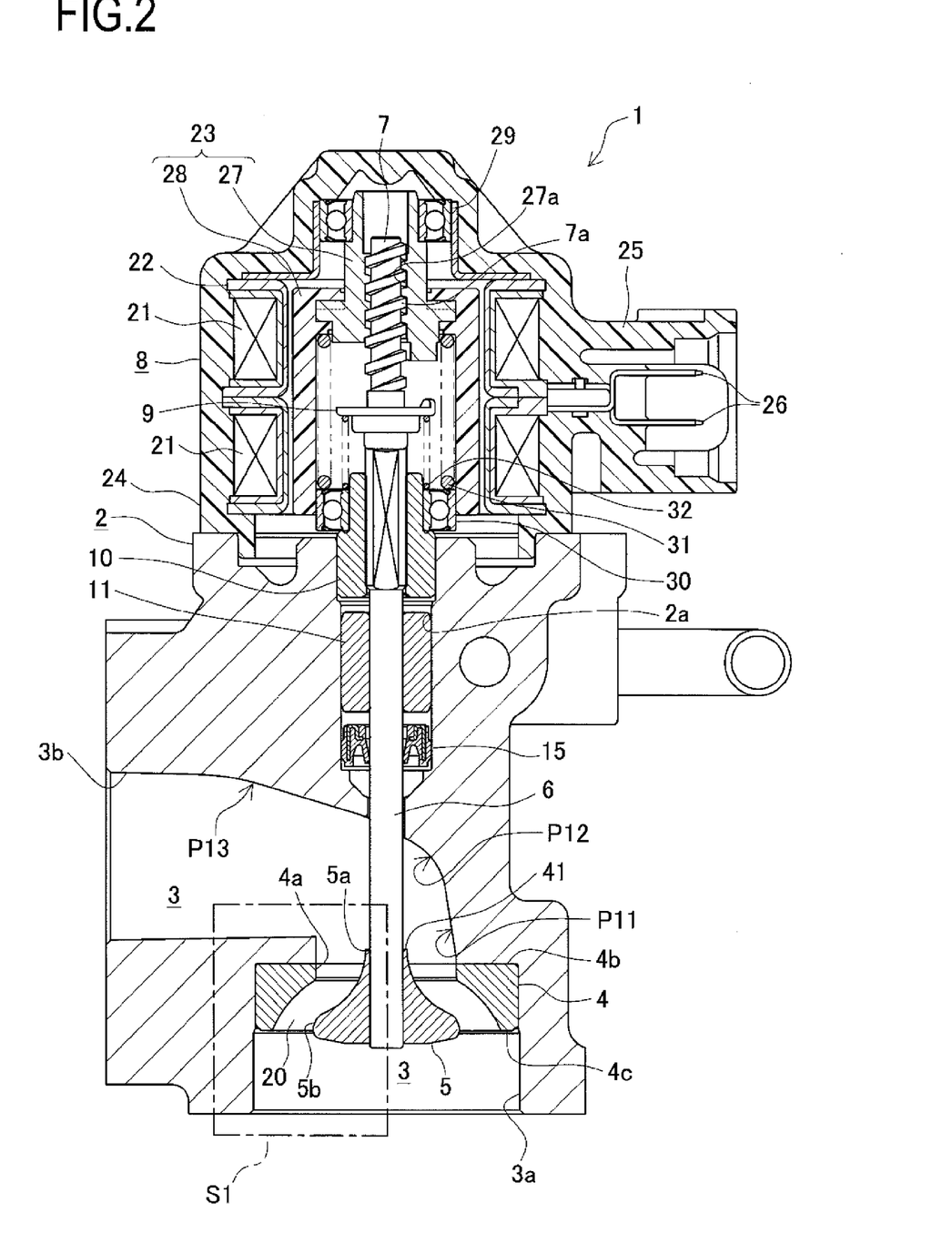
FIG. 2 is another front cross sectional view showing the EGR valve in a fully open state in the embodiment.
Figure 3:
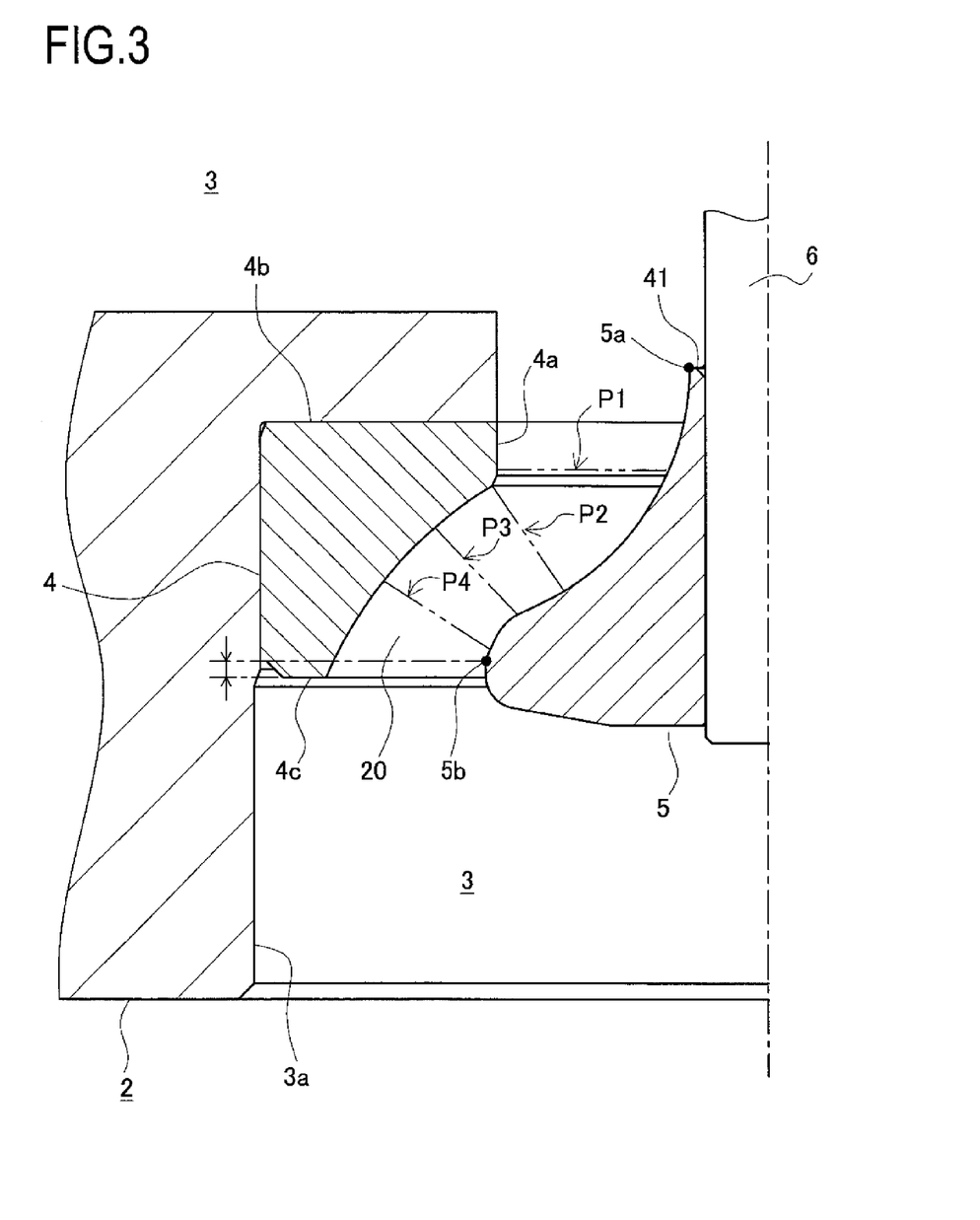
FIG. 3 is an enlarged cross sectional view showing a part surrounded by a rectangular chain line in FIG. 2.

FIG. 1 is a front cross sectional view of an EGR valve 1 in a fully closed state. FIG. 2 is a front cross sectional view of the EGR valve 1 in a fully open state. FIG. 3 is an enlarged cross sectional view of a part surrounded by a rectangular chain line S1 in FIG. 2. The EGR valve 1 will be provided in an EGR passage to return part of exhaust gas discharged from an engine to an intake passage as EGR gas and will be used to regulate a flow rate of EGR gas.

As shown in FIGS. 1 and 2, the EGR valve 1 includes a housing 2, an EGR gas passage 3 formed in the housing 2, a valve seat 4 provided at the midpoint of the passage 3, a valve element 5 provided to be seatable on the valve seat 4 and to form a measuring section 20 for measuring EGR gas in cooperation with the valve seat 4, a valve stem 6 provided, at its one end, with the valve element 5 to move the valve element 5 with respect to the valve seat 4, and an actuator 8 for rotating an output shaft 7 to reciprocally move the valve stem 6 (stroke movement) in an axial direction together with the valve element 5. This EGR valve 1 is configured such that the valve element 5 is moved together with the valve stem 6 by the actuator 8 with respect to the valve seat 4 to adjust an opening area of the measuring section 20, thereby regulating an EGR gas flow rate in the passage 3.

The passage 3 is formed in the housing 2 so that the whole shape of the passage 3 is bent at right angle in a nearly hook shape. Both ends of the passage 3 form an inlet 3a through which EGR gas flows in the passage 3 and an outlet 3b through which EGR gas flows out of the passage 3. The valve seat 4 is provided separately from the housing 2 and installed in the passage 3.

The valve stem 6 is provided between the actuator 8 and the valve element 5 and is placed to vertically extend through the housing 2 in FIGS. 1 and 2. The valve element 5 is provided at a lower end of the valve stem 6 and has a nearly conical shape. This valve element 5 is moved into or out of contact with the valve seat 4. A spring retainer 9 is integrally formed at an upper end of the valve stem 6. Between the housing 2 and the valve stem 6, a first thrust bearing 10 and a second thrust bearing 11 are arranged in series to support the valve stem 6 to allow stroke movement of the valve stem 6. Each of the thrust bearings 10 and 11 has a nearly cylindrical shape and fixedly fitted in a mounting hole 2a formed at the center of the housing 2. A cross section of the first thrust bearing 10 has a nearly oval shape and regulates the rotation direction of the valve stem 6.

The actuator 8 consists of a step motor and includes a stator 22 including a coil 21, a magnet rotor 23 provided inside the stator 22, and an output shaft 7 provided at the center of the magnet rotor 23. The above members 7, 21 to 23 are covered by resin casing 24. This casing 24 is integrally formed with a connector 25 protruding sideways. The connector 25 is provided with terminals 26 each extending from the coil 21.

The output shaft 7 has a male screw 7a on an outer periphery. A lower end of the output shaft 7 is connected to the spring retainer 9 provided at the upper end of the valve stem 6. The magnet rotor 23 includes a rotor body 27 and a cylindrical plastic magnet 28 integrally provided on the outer periphery of the rotor body 27. A first radial bearing 29 is provided on the outer periphery of the upper end portion of the rotor body 27 and between the same and the casing 24. A second radial bearing 30 is provided on the inner periphery of the lower end portion of the plastic magnet 28 and between the same and the first thrust bearing 10. By these upper and lower radial bearings 29 and 30, the magnet rotor 23 is rotatably supported inside the stator 22. The rotor body 27 is formed, at its center, with a female screw 27a threadedly engaging with the female screw 7a of the output shaft 7. A first compression spring 31 is provided between the magnet rotor 23 and the lower second radial bearing 30. A second compression spring 32 is provided between the spring retainer 9 at the upper end of the valve stem 6 and the second radial bearing 30 to urge the valve stem 6 toward the magnet rotor 23.

Between the housing 2 and the valve stem 6, a nearly-cylindrical lip seal 15 for sealing between the housing 2 and the valve stem 6 is provided adjacent to the second thrust bearing 11. This lip seal 15 is directly press-fitted in the mounting hole 2a. The valve stem 6 extends through the center of the lip seal 15.

In the present embodiment, as shown in FIGS. 1 to 3, the valve seat 4 includes a valve hole 4a formed in the center thereof and also a first end face 4b and a second end face 4c arranged in an axial direction (an up-down direction in FIGS. 1 to 3). The first end face 4b is placed to face to a downstream side of the passage 3 and the second end face 4c is placed to face to an upstream side of the passage 3. The inner peripheral surface of the valve hole 4a includes a concave curved shape so that the inner diameter of the valve hole 4a gradually increases toward the second end face 4c.

The valve element 5 is placed inside the valve hole 4a and provided to be movable together with the valve stem 6 in the axial direction of the valve seat 4 between a fully closed position in which the valve element 5 contacts the inner peripheral surface of the valve hole 4a as shown in FIG. 1 and a fully open position in which the valve element 5 is separated at a maximum from the inner peripheral surface of the valve hole 4a as shown in FIG. 2.

In the present embodiment, as shown in FIGS. 2 and 3, while the valve element 5 is placed in the fully open position, parts of the measuring section 20 in the EGR gas flow direction have approximate passage widths in cross section ("passage section width"). Specifically, as shown in FIG. 3, a first part P1, a second part P2, a third part P3, and a fourth part P4 of the measuring section 20 are made approximate to each other in passage section width. In this state, accordingly, the measuring section 20 is continuous from its upstream end to downstream end with almost the same passage section width.

In the present embodiment, as shown in FIGS. 1 to 3, the valve element 5 is mounted at the lower end of the valve stem 6 so that the valve stem 6 penetrates through the valve element 5. The valve element 5 includes a minimum diameter portion 5a and a maximum outer-diameter portion 5b and is placed so that the maximum outer-diameter portion 5b is positioned more upstream than the minimum outer-diameter portion 5a in the passage 3. The outer peripheral surface of the valve element 5 is concave-curved near the minimum outer-diameter portion 5a and convex-curved near the maximum outer-diameter portion 5b. A shoulder 41 is provided at a boundary between the minimum outer-diameter portion 5a of the valve element 5 and the valve stem 6. This shoulder 41 is set to be located more downstream than the first end face 4b of the valve seat 4 in a movable range of the valve element 5 from the fully closed position and the fully open position as seen in FIGS. 1 and 2.

In the present embodiment, as shown in FIGS. 2 and 3, while the valve element 5 is placed in the fully open position, the maximum outer-diameter portion 5b of the valve element 5 is placed more inside the valve hole 4a than the second end face 4c of the valve seat 4 in an axial direction.

In the present embodiment, furthermore, the passage 3 is different in the shape of the inner surface from the conventional EGR valve 61 shown in FIGS. 7 and 8 as below. Specifically, in the order from one located directly downstream of the valve seat 4, a first part P11 of the passage 3 is slanted toward the downstream side, a second part P12 is curved, and a third part P13 is slanted to widen toward the downstream side.

According to the EGR valve 1 of the present embodiment explained above, the valve stem 6 is stroke-moved by the actuator 8 to move the valve element 5 together with the valve stem 6 with respect to the valve seat 4, thereby adjusting an opening area of the measuring section 20 to regulate an EGR gas flow rate in the passage 3. Herein, the inner peripheral surface of the valve hole 4a of the valve seat 4 includes a concave curved shape so that the inner diameter gradually increases toward the second end face 4c located on the upstream side. While the valve element 5 is placed in the fully open position, the passage section width in each part of the measuring section 20 in the EGR gas flow direction is approximate to each other. Accordingly, the EGR gas is allowed to smoothly flow from the upstream side of the passage 3 into the valve hole 4a along the curved inner peripheral surface of the valve hole 4a, flow without being sharply constricted by the measuring section 20 between the valve seat 4 and the valve element 5, and directly flow out of the valve hole 4a toward the downstream side of the passage 3. This can reduce pressure loss of the EGR gas and thus reduce stagnation and peel-off (eddy) which may cause disturb a flow of EGR gas before and behind the measuring section 20. This results in a rapid flow of EGR gas to a downstream side than the measuring section 20 in the passage 3. It is therefore possible to increase a maximum flow rate of EGR gas without particularly increasing the opening area of the measuring section 20. Since the opening area of the measuring section 20 is not particularly increased, the EGR gas flow rate can be precisely regulated in a low opening region.

Figure 4:
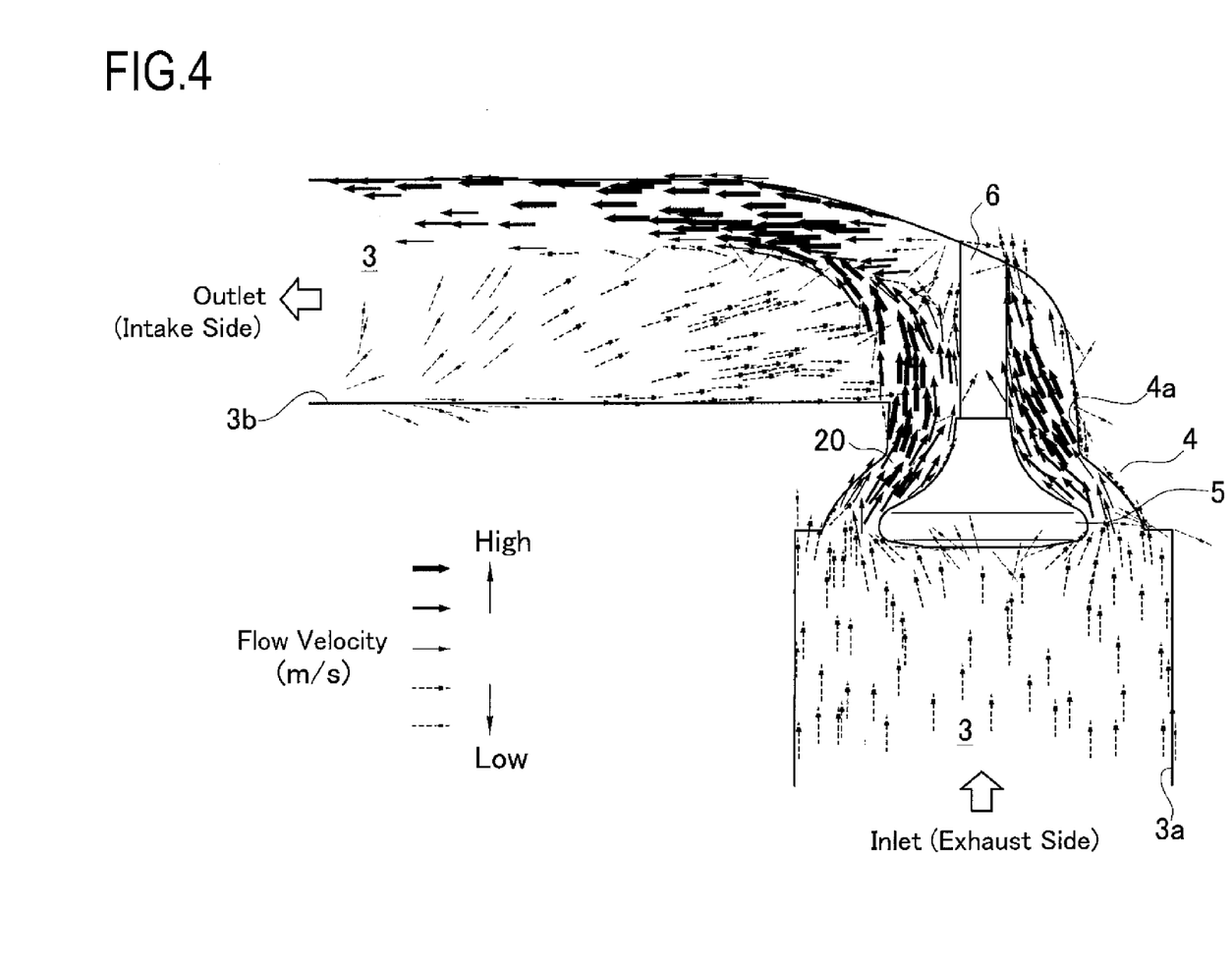
FIG. 4 is an explanatory diagram showing CAE analysis result of EGR gas flow (EGR gas flow direction and EGR gas flow velocity distribution) in a passage in the fully open state of the EGR valve in the embodiment.
Figure 5:
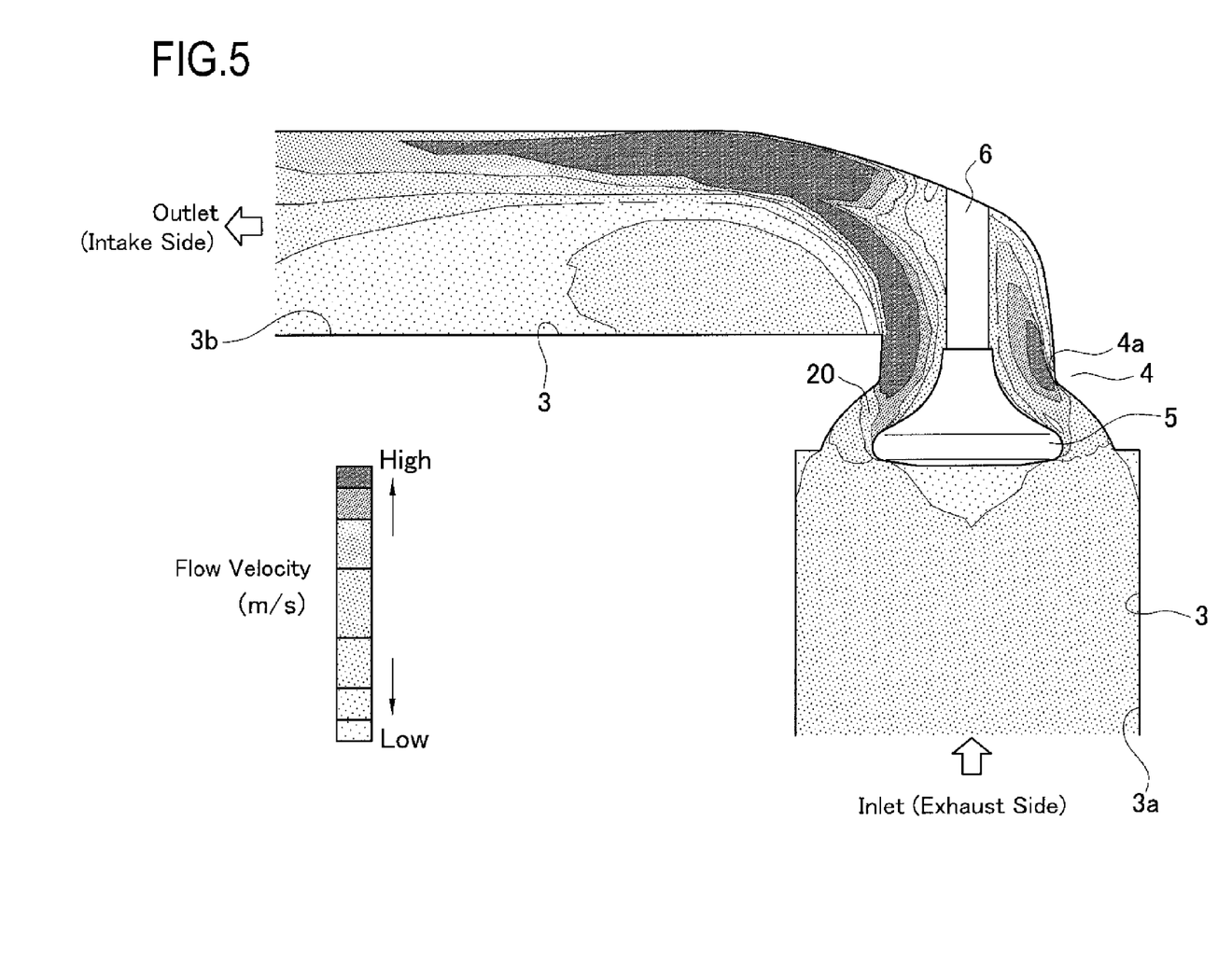
FIG. 5 is an explanatory diagram showing CAE analysis result (EGR gas flow velocity distribution) of an EGR gas flow in the passage in the fully open state of the EGR valve in the embodiment.

FIG. 4 is an explanatory view showing CAE analysis result of EGR gas flow (EGR gas flow direction and EGR gas flow velocity distribution) in the passage 3 in the fully open state of the EGR valve 1 of the present embodiment. In FIG. 4, the direction of each arrow represents a flowing direction of EGR gas, meaning that the flow velocity of EGR gas is higher as the arrow is thicker. FIG. 5 is an explanatory view showing CAE analysis result of an EGR gas flow (EGR gas flow velocity distribution) in the passage 3 in the fully open state of the EGR valve 1 of the present embodiment. In FIG. 5, darker hatching represents that the flow velocity of EGR gas is faster. As shown in FIGS. 4 and 5, it is found that the EGR gas flow along the inner peripheral surface of the passage 3 flows to the valve hole 4a without impinging the second end face 4c of the valve seat 4, flows in the measuring section 20 between the valve seat 4 and the valve element 5 at an increasing flow velocity, and directly flows out of the valve hole 4a toward the downstream side of the passage 3. It is further found that the EGR gas flowing out of the valve hole 4a flows along the upper side of the inner peripheral surface of the passage 3 toward an outlet 3a while maintaining a high flow velocity. In the EGR valve 1 of the present embodiment, as above, the EGR gas flowing out of the valve hole 4a can maintain the high flow velocity, so that the maximum flow rate of EGR gas can be increased by just that much. On the other hand, regarding the conventional EGR valve 61, it is found as shown in FIGS. 9 and 10 that the EGR gas flowing out of the measuring section between the valve seat 64 and the valve element 65 rises in flow velocity only around the valve stem 66 but loses speed as the flow is farther away from the valve stem 66. In the conventional EGR valve 61, therefore, it is impossible to increase the maximum flow rate of the EGR gas flowing out of the valve hole 64a.

Figure 6:
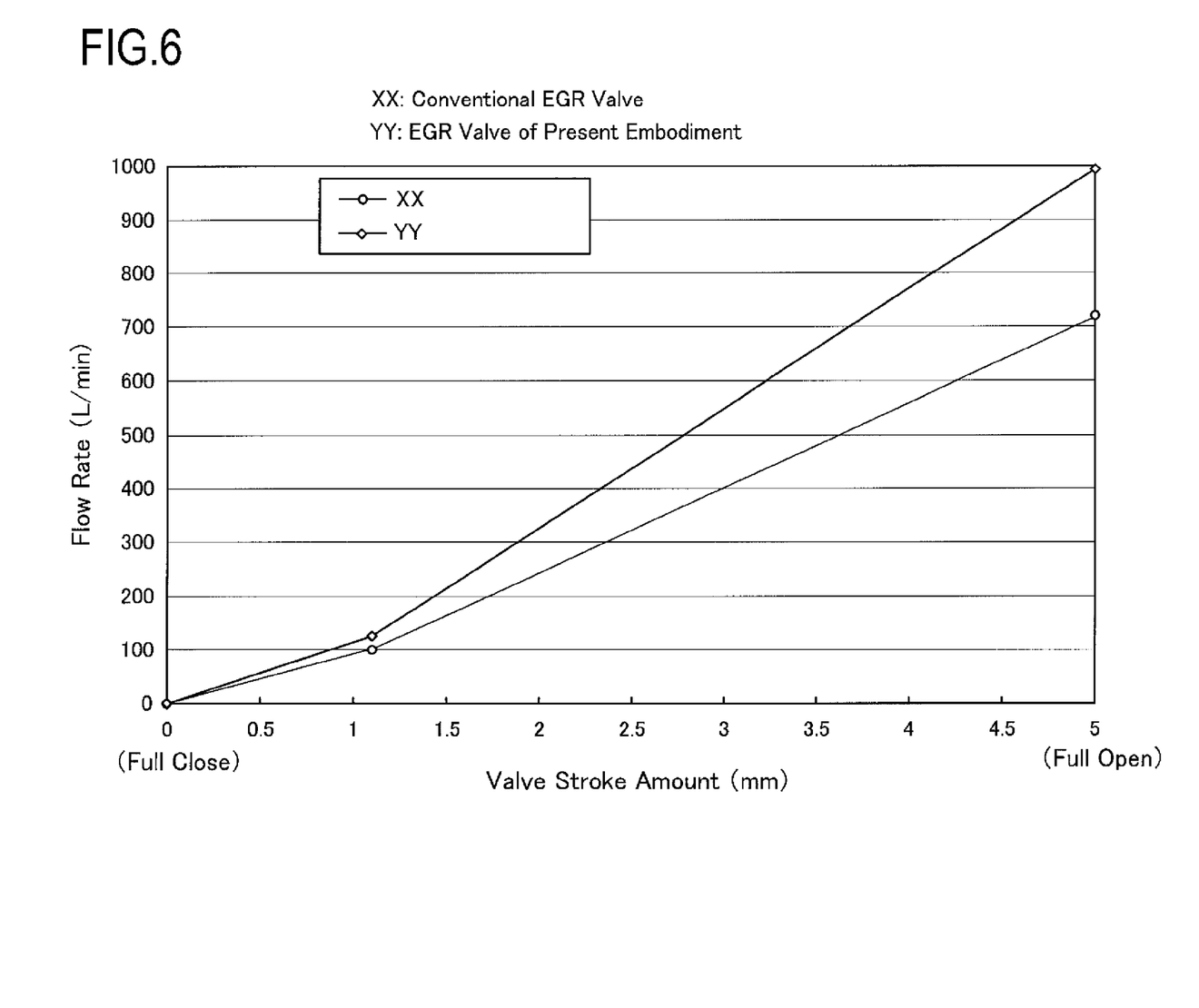
FIG. 6 is a graph showing gas flow rate characteristics by comparison between the EGR valve of the embodiment and a conventional EGR valve.

FIG. 6 is a graph showing the EGR valve 1 of the present embodiment and the conventional EGR valve 61 by comparing gas flow rate characteristics. In this graph, the lateral axis represents the valve stroke amount corresponding to the opening degrees of EGR valve 1 and 61 and the vertical axis represents an EGR gas flow rate. Herein, this comparison is made assuming that the inner diameter of the valve hole 4a of the EGR valve 1 is equal to the inner diameter of the valve hole 64a of the EGR valve 61. This graph reveals that flow rate characteristics in a low opening region are approximate to each other between the EGR valves 1 and 61 and thus flow control can be accurately conducted. This graph further reveals that, in a middle opening region and a high opening region, an increasing rate of the flow rate and a maximum flow rate are both higher in the EGR valve 1 of the present embodiment than in the conventional EGR valve 61.

In the present embodiment, while the valve element 5 is placed in the fully open position, a concave curve and a convex curve of the outer peripheral surface of the valve element 5 in the axial direction conform to a convex curve and a concave curve of the inner peripheral surface of the valve seat 4 in the axial direction. The space for the measuring section 20 between the valve element 5 and the valve seat 4 is smoothly bent in the flowing direction of EGR gas. Therefore, the EGR gas smoothly flows in the measuring section 20 and directly flows out of the valve hole 4a toward the downstream side of the passage 3. In this regard, the pressure loss of EGR gas can be reduced, the EGR gas is allowed to further smoothly flow to a more downstream side than the measuring section 20 in the passage 3. This can further increase the maximum flow rate of EGR gas without especially increasing the opening area of the measuring section 20.

In the present embodiment, while the valve element 5 is placed in the fully open position, the maximum outer-diameter portion 5b of the valve element 5 is located more inside the valve hole 4a than the second end face 4c of the valve seat 4. Accordingly, the passage section width of each part P1 to P4 in the measuring section 20 in the EGR gas flow direction does not sharply change by the maximum outer-diameter portion 5b of the valve element 5. Thus, the EGR gas is allowed to smoothly flow through the measuring section 20 and flow out of the valve hole 4a directly toward the downstream side of the passage 3. In this respect, it is possible to reduce pressure loss of EGR gas, allow the EGR gas to more smoothly flow to a more downstream side than the measuring section 20 in the passage 3, and further increase the maximum flow rate of EGR gas without particularly increasing the opening area of the measuring section 20.

In the present embodiment, the shoulder 41 between the valve element 5 and the valve stem 6 does not enter in the valve hole 4a of the valve seat 4, so that the passage section with of each part P1 to P4 in the measuring section 20 in the EGR gas flow direction does not sharply change by the shoulder 41. This allows the EGR gas to smoothly flow in the measuring section 20 and flow out of the valve hole 4a directly toward the downstream side of the passage 3. In this regard, pressure loss of EGR gas can be reduced, the EGR gas is allowed to more smoothly flow to the passage 3 downstream than the measuring section 20, and the maximum flow rate of EGR gas can be further increased without particularly increasing the opening area of the measuring section 20.

In the present embodiment, furthermore, the shape of the inner surface of the passage 3 is designed such that the first part P11 is slanted toward the downstream side, the second part P12 is curved, and the third part P13 is slanted to widen toward the downstream side. Those inner surface shapes of the passage 3 also contribute to smooth flowing of the EGR gas flowing out of the valve hole 4a of the valve seat 4, thereby enabling the flow velocity of EGR gas to be maintained or increased.

The present invention is not limited to the above embodiment and may be embodied in other specific forms without departing from the essential characteristics thereof.

For instance, although the actuator 8 in the present embodiment consists of a step motor, it may be a diaphragm-type actuator.

INDUSTRIAL APPLICABILITY

The present invention is applicable to an EGR apparatus provided in a gasoline engine and a diesel engine.

REFERENCE SIGNS LIST

1 EGR valve
2 Housing
3 Passage
4 Valve seat
4a Valve hole
4b First end face
4c Second end face
5 Valve element
5a Minimum outer-diameter portion
5b Maximum outer-diameter portion
6 Valve stem
20 Measuring section
41 Shoulder

The invention claimed is:
1. An exhaust gas recirculation valve including:
a housing including a passage for exhaust recirculation gas;
a valve seat provided in the passage;
a valve element provided to be seatable on the valve seat and arranged to form a measuring section of the exhaust recirculation gas between the valve seat and the valve element; and
a valve stem provided with the valve element at one end, the valve element being configured to move together with the valve stem with respect to the valve seat to adjust an opening area of the measuring section and regulate a flow rate of the exhaust recirculation gas,
wherein the valve seat includes a valve hole at a center thereof and the valve hole has a concave curved shape so that an inner diameter of the valve hole gradually increases from a downstream side to an upstream side of the valve hole, a downstream end of the valve hole being open in the passage, the valve element is placed inside the valve hole and provided to be movable together with the valve stem in an axial direction of the valve seat between a fully closed position in which the valve element contacts with the inner peripheral surface of the valve hole and a fully open position in which the valve element is separated at a maximum from the inner peripheral surface of the valve hole, the valve element has a shape that is convex-curved on an upstream side of a seating portion to be seated on the valve seat and is concave-curved on a downstream side of the seating position, while the valve element is placed in the fully open position, parts of the measuring section in a flow direction of the exhaust recirculation gas have approximately same passage widths in cross section, and the valve element has a shape including a minimum outer-diameter portion having a minimum outer-diameter and a maximum outer-diameter portion having a maximum outer-diameter so that the maximum outer-diameter portion is placed upstream of the minimum outer-diameter portion in the passage, and an outer peripheral surface of the valve element is concave curved around the minimum outer-diameter portion and convex curved around the maximum outer-diameter portion.

2. The exhaust gas recirculation valve according to claim 1, wherein the valve element has a small-diameter portion located upstream of the maximum outer-diameter portion, the small-diameter portion having a smaller diameter than the maximum outer-diameter.

3. The exhaust gas recirculation valve according to claim 2, wherein while the valve element is placed in the fully open position, the maximum outer-diameter portion of the valve element is placed downstream of an upstream end of the concave-curved shape of the valve seat.

4. The exhaust gas recirculation valve according to claim 2, wherein the minimum outer-diameter portion of the valve element is located downstream of the valve hole in a movable range of the valve element.

5. The exhaust gas recirculation valve according to claim 3, wherein the minimum outer-diameter portion of the valve element is located downstream of the valve hole in a movable range of the valve element.

6. The exhaust gas recirculation valve according to claim 1, wherein the shape of the valve element is conical.

\* \* \* \* \*